(12) United States Patent
Betarbet

(10) Patent No.: US 8,165,885 B2
(45) Date of Patent: *Apr. 24, 2012

(54) METHODS, SYSTEMS, AND COMPUTER-READABLE MEDIA FOR ASSOCIATING DYNAMIC SOUND CONTENT WITH A WEB PAGE IN A BROWSER

(75) Inventor: Sandeep Betarbet, Lilburn, GA (US)

(73) Assignee: AT&T Intellectual Property I, LP, Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/505,141

(22) Filed: Jul. 17, 2009

(65) Prior Publication Data
US 2009/0282053 A1 Nov. 12, 2009

Related U.S. Application Data

(63) Continuation of application No. 10/943,384, filed on Sep. 17, 2004, now Pat. No. 7,580,841.

(51) Int. Cl.
G10L 11/00 (2006.01)
G10L 21/00 (2006.01)

(52) U.S. Cl. .................... 704/270.1; 704/270

(58) Field of Classification Search ................ 704/270, 704/270.01
See application file for complete search history.

(56) References Cited

U.S. PATENT DOCUMENTS

| | | | | |
|---|---|---|---|---|
| 6,012,098 A * | 1/2000 | Bayeh et al. | ................ | 709/246 |
| 6,732,142 B1 * | 5/2004 | Bates et al. | ................ | 709/203 |
| 6,912,691 B1 * | 6/2005 | Dodrill et al. | ................ | 715/234 |
| 2002/0046240 A1 * | 4/2002 | Graham et al. | ................ | 709/203 |
| 2002/0178007 A1 * | 11/2002 | Slotznick et al. | ................ | 704/270.1 |

* cited by examiner

Primary Examiner — Samuel G Neway
(74) Attorney, Agent, or Firm — Parks IP Law LLC; Jennifer P. Medlin, Esq.

(57) ABSTRACT

Methods, systems, and computer-readable media are provided for associating dynamic sound content with a web page in a browser. A request for text data is received from the browser. The requested text data is retrieved from a source, such as a database, and converted into a sound file. The retrieved text data may be converted to a sound file by translating the text data into audio data, formatting the audio data based on a predetermined audio format, and writing the formatted audio data to a file. A web page is created including a sound tag pointing to a file path associated with the sound file. The created web page is then sent in a response to the browser. Once the web page is received by the browser, the browser initiates playback of the sound file from the file path.

17 Claims, 4 Drawing Sheets

METHODS, SYSTEMS, AND COMPUTER-READABLE MEDIA FOR ASSOCIATING DYNAMIC SOUND CONTENT WITH A WEB PAGE IN A BROWSER

CROSS-REFERENCE TO RELATED APPLICATION

This application is a continuation of U.S. patent application Ser. No. 10/943,384, filed Sep. 17, 2004, now issued as U.S. Pat. No. 7,580,841.

TECHNICAL FIELD

The present invention relates to web page design. More particularly, the present invention is related to associating dynamic sound content with a web page in a browser

BACKGROUND OF THE INVENTION

Many web pages accessed through a web browser require users to search through an abundance of content to find information of interest. In order to highlight content which may be of interest, web page designers often incorporate color, unique fonts, and animation to focus a user's attention. Since users are often more sensitive to sound than text, sound effects, such as speech, are also used by web page designers to highlight specific content in a web page. Speech may also be used in web pages to enable disabled users to utilize web browsers more effectively.

Previously, the usage of sound in conveying content to the user in web pages has been limited to "static" sound. Static sound typically includes prerecorded speech or short audio clips which are streamed from a web server or downloaded completely to a client computer, for playback in a browser using a media player. Use of the media player, however, typically requires the user to install a "plug-in" in the browser for playback of the sound. Moreover, since static sound is isolated from other content on the web page, it is typically better suited for providing ambience rather than information.

SUMMARY OF THE INVENTION

In accordance with the present invention, the above and other problems are addressed by methods, systems, and computer-readable media for associating dynamic sound content with a web page in a browser. The dynamic sound content is associated with other content presented in a web page to communicate information to a user.

According to one illustrative embodiment of the invention, a method is provided for associating dynamic sound content with a web page in a browser. The method includes receiving a request for text data from the browser. The method further includes retrieving the requested text data from a source, such as a database, and converting the retrieved text data into a sound file. The retrieved text data may be converted to a sound file by translating the text data into audio data, formatting the audio data based on a predetermined audio format, and writing the formatted audio data to a file. The method further includes creating a web page comprising a sound tag pointing to a file path associated with the sound file and sending the created web page in a response to the browser. Once the web page is received by the browser, the browser initiates playback of the sound file from the file path. The sound file may include speech.

Illustrative embodiments of the invention may be implemented on a computer system or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features, as well as advantages, which characterize the present invention, will be apparent from a reading of the following detailed description and a review of the associated drawings.

DETAILED DESCRIPTION OF THE INVENTION

Figure 1:
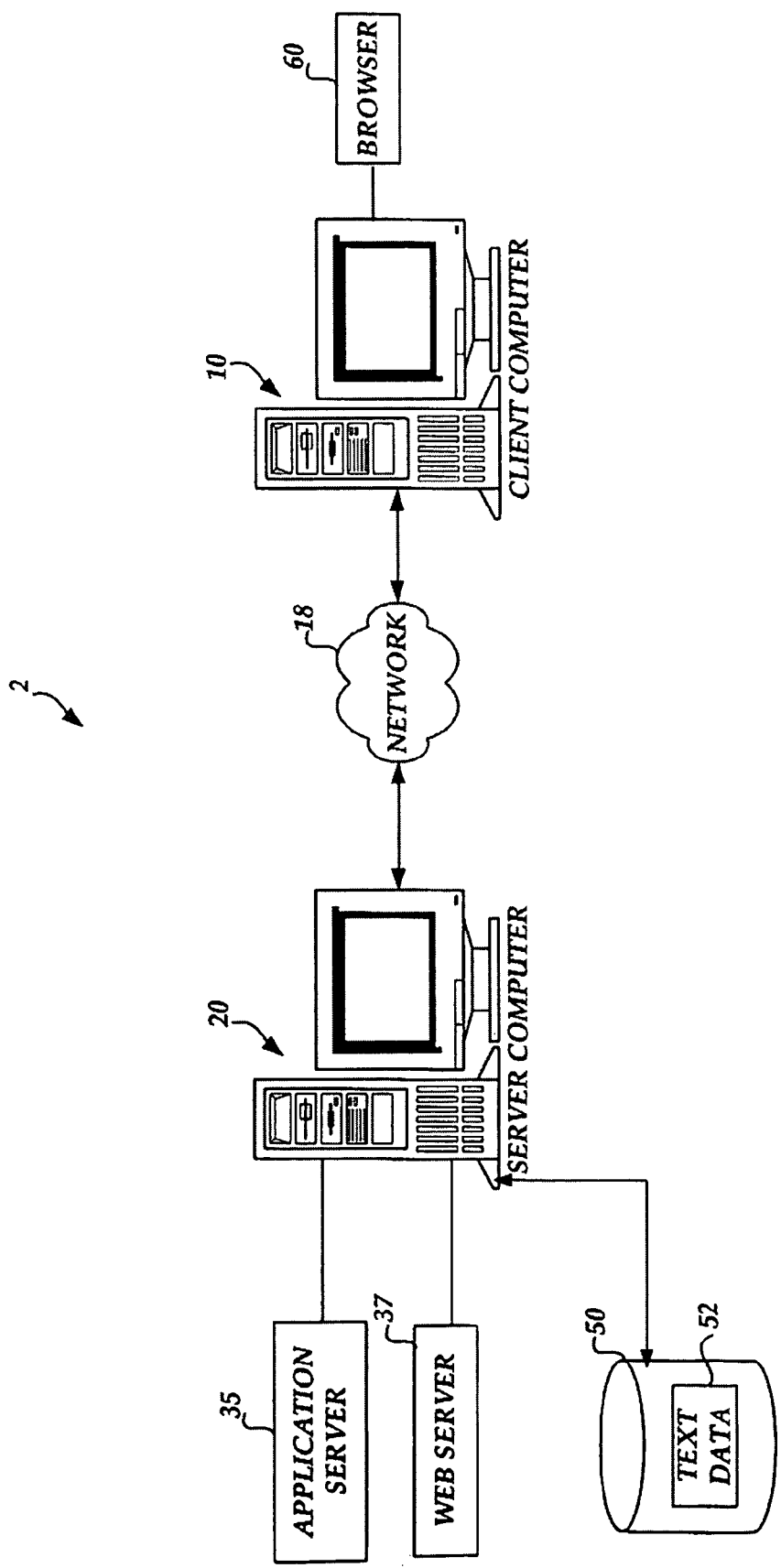
FIG. 1 is a system diagram illustrating aspects of a computer system utilized in and provided by the various embodiments of the invention.

In accordance with the present invention, the above and other problems are solved by methods, systems, and computer-readable media for associating dynamic sound content with a web page in a browser. The dynamic sound content is associated with other content presented in a web page to communicate information to a user. Referring now to the drawings, in which like numerals represent like elements, various aspects of the present invention will be described.

FIG. 1 and the following discussion are intended to provide a brief, general description of a suitable computing environment in which the invention may be implemented. While the invention will be described in the general context of program modules that execute in conjunction with an application program that runs on a computer system, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Turning now to FIG. 1, an illustrative computer architecture for a computer system 2 which was discussed briefly above, for practicing the various embodiments of the invention will be described. The computer system 2 includes a client computer 10 in communication with a server computer 20, both of which are connected to a network 18. The client computer 10 stores a browser 60 for viewing web pages received over the network 18. The server computer 20 is capable of storing and executing a number of computer programs including an application server 35, a web server 37 for delivering web pages to the browser 60, and a database 50 for storing text data 52. Those skilled in the art will appreciate that the database 50 may also be stored on an external computer system (not shown) in communication with the computer system 2 over the network 18. The application server 35 links the database 50 to the web server 37, and enables the browser 60 to request the text data 52 from the database for display on the client computer 10. The application server 35 also includes software components for associating dynamic sound content with a web page. The server computer 20 and the aforementioned software components will be described in greater detail in the discussion of FIGS. 2-3, below.

Figure 2:
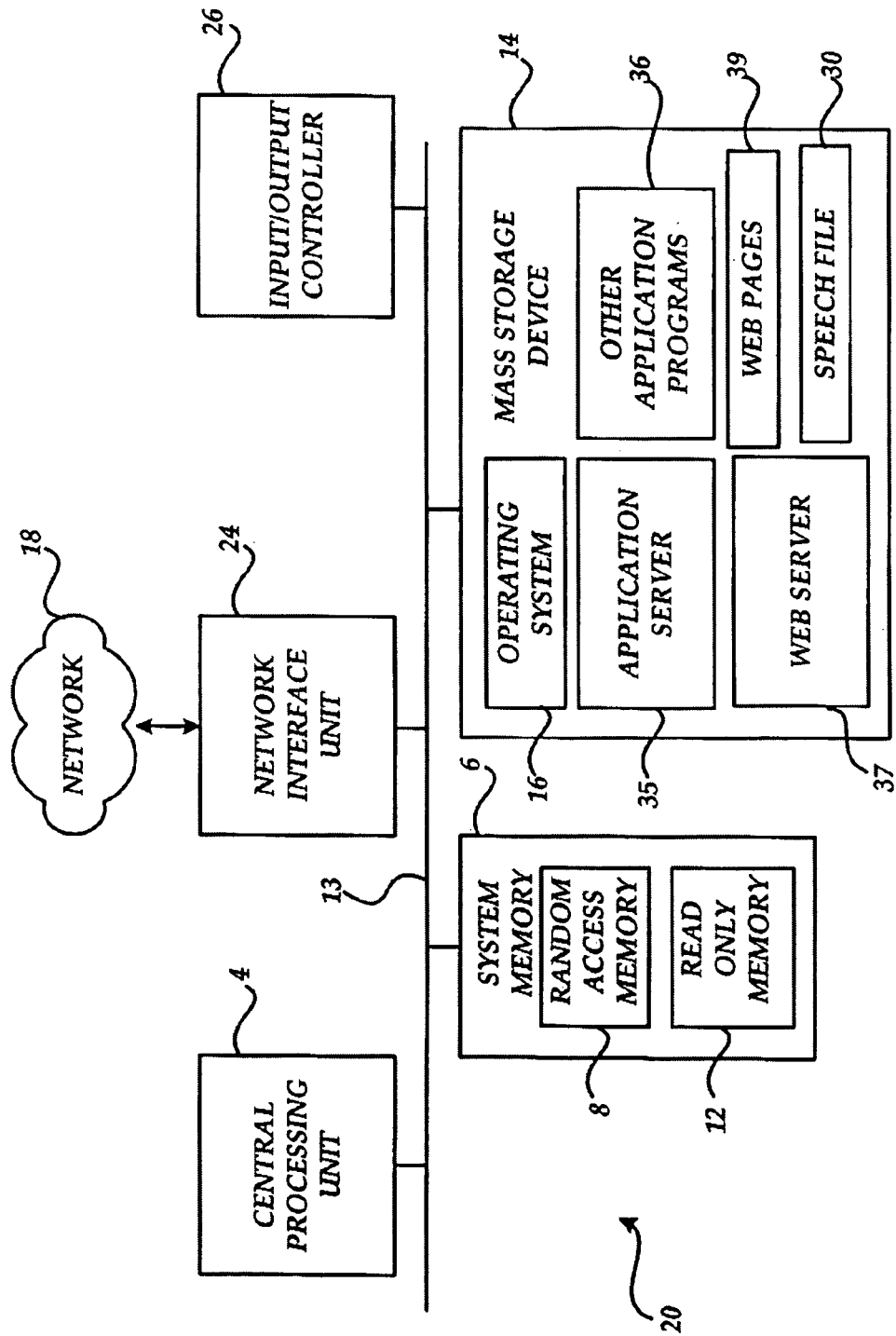
FIG. 2 is a system diagram illustrating aspects of a server computer in the computer system of FIG. 1, utilized in and provided by the various embodiments of the invention.

FIG. 2 is a system diagram illustrating aspects of the server computer 20 discussed above with respect to FIG. 1. The server computer 20 includes a central processing unit 4 ("CPU"), a system memory 6, including a random access memory ("RAM") 8 and a read-only memory ("ROM") 12, a network interface unit 24, and an input/output controller 26, all of which are connected to a system bus 13. The system bus 13 provides a two-way communication path for all of the connected components. Buses are well-known to those skilled in the art, and therefore not discussed in further detail herein.

The CPU 4 is a standard central processor that performs arithmetic and logical operations necessary for the operation of the server computer 20. CPUs are well-known in the art, and therefore not described in further detail herein. The network interface unit 24 is configured to establish logical connections between the server computer 20 to the client computer 10 via the network 18. Connections which may be made by the network interface unit 24 may include local area network (LAN) or wide area network (WAN) connections. LAN and WAN networking environments are commonplace in offices, enterprise-wide computer networks, intranets, and the Internet.

The input/output controller 26 is used as a communication medium between any number and type of peripheral devices and the system bus 13. Communications destined for the CPU 4 or any other component coupled to the system bus 13 and issued by a peripheral device must therefore pass through the input/output controller 26, the system bus 13 and then to the necessary component. As shown in FIG. 2, the input/output controller 26 is connected to a mass storage device 14. The input/output controller 26 may also receive and process input from a number of input devices, including a keyboard, mouse, or electronic stylus (not shown). Similarly, the input/output controller 26 may provide output to a display screen, a printer, or other type of output device.

The mass storage device 14 and its associated computer-readable media, provide non-volatile storage for the server computer 20. Although the description of computer-readable media contained herein refers to a mass storage device, such as a hard disk or CD-ROM drive, it should be appreciated by those skilled in the art that computer-readable media can be any available media that can be accessed by the remote computer system 100. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

The mass storage device 14 stores an operating system 16 and various application programs. The operating system 16 encompasses a set of programs that control operations of the server computer 20 and allocation of resources. An application program is software that runs on top of the operating system software and uses computer resources made available through the operating system to perform application specific tasks desired by the user. The application programs stored by the mass storage device 14 include the application server 35, the web server 37, and other application programs 36. The mass storage device 14 also stores a number of files including web pages 39 and a speech file 30. As briefly discussed above with respect to FIG. 1, the application server 35 includes various components for generating and associating dynamic sound content with web pages. As defined herein, "dynamic sound content" refers to text data which is converted to a sound file (such as the speech file 30) and incorporated into a created web page for playback in a browser, at the moment the data is needed or requested. The application server 35 will be discussed in greater detail below with respect to FIG. 3.

Figure 3:
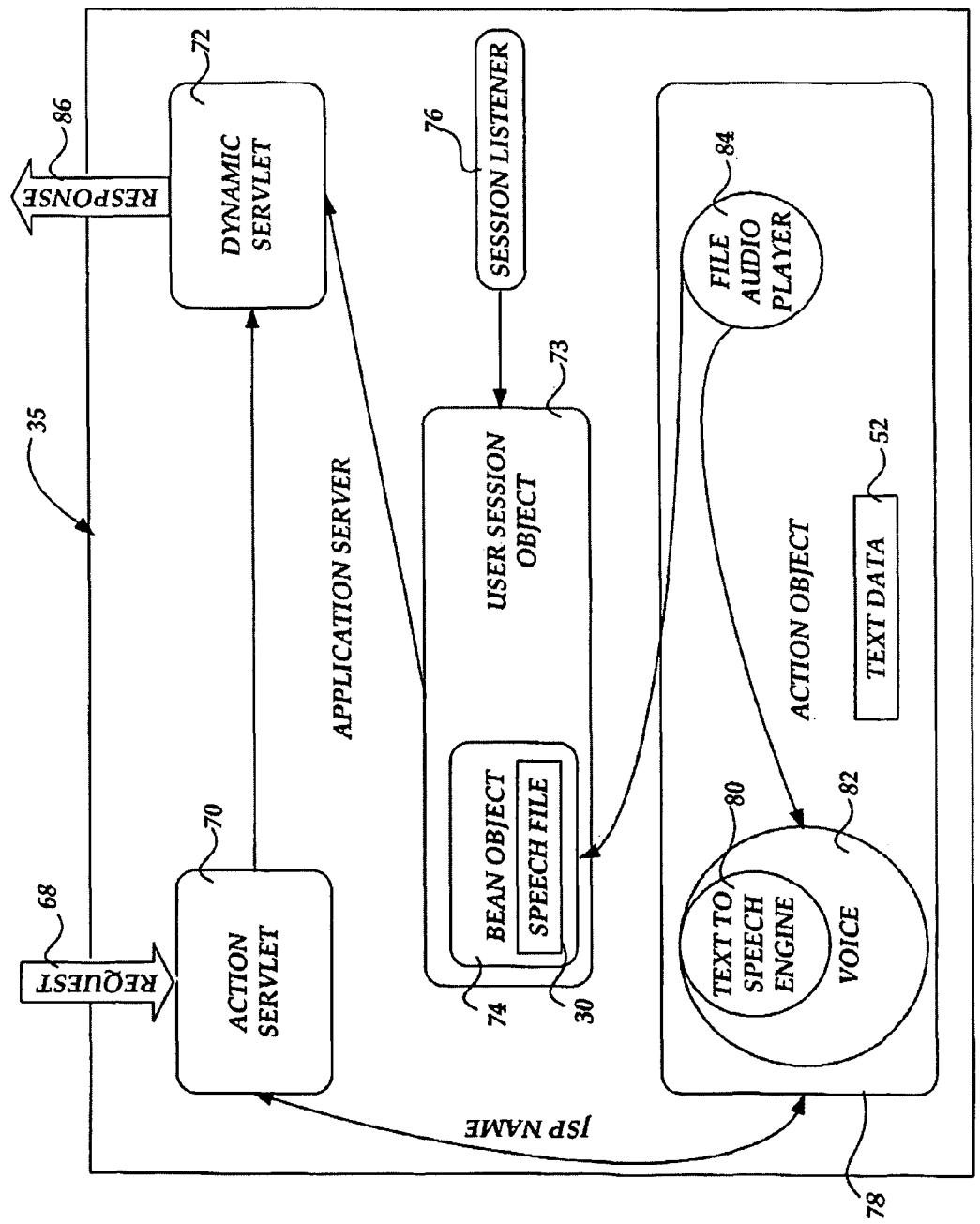
FIG. 3 is a block diagram illustrating components of an application server program running on the server computer system of FIG. 2, for associating dynamic sound content with a web page, according to one embodiment of the invention.

FIG. 3 is a block diagram illustrating the software components of the application server 35 for associating dynamic sound content with a web page, according to an illustrative embodiment of the invention. The application server 35 includes an action servlet 70 in communication with an action object 78 and a dynamic servlet 72. Servlets are small programs, such as Java applets, that run within a web server environment which are capable of persisting in a computer memory to fulfill multiple requests. Objects are self-contained entities consisting of both data and procedures to manipulate the data. Servlets and objects are well-known in the art, and therefore not described in further detail herein.

The action servlet 70 receives a browser request 68 from the web browser 60 to incorporate sound content into a web page created by the dynamic servlet 72. The action object 78 receives instructions from the action servlet 70 to create the requested sound content. The action object 78 may create the sound content by retrieving the text data 52 from the database 50 and utilizing text-to-speech ("TTS") engine 80 to select a voice object 82 for "reading" the input text data 52. As is known to those skilled in the art, the voice object 82 may encompass a number of attributes including, but not limited to, vocabulary, pitch, rate of speech, volume, duration of stretch, range of the pitch. Once a voice object has been selected, the TTS 80 then translates the text data 52 into raw byte arrays which are transformed by file audio player 84 into the speech file 30. The file audio player 84 may format the raw byte arrays and create the speech file 30 based on a specified audio format (e.g., a WAV file) and save it to a file location in the server computer 20.

The action object 78 checks user session object 73 for the existence of a bean object 74. The bean object 74 may be an object corresponding to the JavaBeans specification developed by Sun Microsystems, Inc. of Santa Clara, Calif. The user session object 73 is an object associated with a browser session. The user session object 73 is created within the application server 35 when an initial request is received from the browser 60. The user session object 73 is available to all objects within the application server 35 which receive, formulate, and return a response to requests from the browser 60. The user session object 73 holds objects (such as the bean object 74) for the duration of a browser session. Objects may be inserted and retrieved from the user session object 73 by name. If a named object does not exist in the user session object 73, the action object 78 may create objects (i.e., the bean object 74) and insert them into the session object 73. The action object 78 also returns the name of a dynamic servlet (which will return the response to the browser request) to the action servlet 70.

The action servlet 70 receives the name of the dynamic servlet 72 from the action object 78. The action servlet 70 also selects the dynamic servlet 72 for serving the dynamic sound content. It will be appreciated that the dynamic servlet 72 may be one of many dynamic servlets available to the action servlet 70. The action object 78 creates the bean object 74 inserts the bean object 74 into the user session object 73 with a name (e.g., "speechfile"). It should be understood that the user session 73 is a shared object which is accessible to the dynamic servlet 72. Those skilled in the art will appreciate that since the action object 78 cannot pass messages directly to the dynamic servlet 72, the user session object 73 (i.e., the shared object) is utilized. The action servlet 70 searches for an available instance of the dynamic servlet 72 and directs the dynamic servlet 72 to formulate and return a response. If an instance of the dynamic servlet is not found by the action servlet 70, then the action servlet 70 creates a new instance of the dynamic servlet 72.

The dynamic servlet 72 may be created by compiling a java server page ("JSP") file into java code and subsequently compiling it into a dynamic servlet by the application server 35. It should be understood by those skilled in the art that JSPs contain special (i.e., non-HTML) tags. These tags act as placeholders for dynamic HTML or text content. They can also be placed within HTML tags to assign values to HTML tag attributes. The dynamic servlet retains the original HTML content (of the JSP file) but replaces the non-HTML tags with dynamic content. JSPs help make HTML more functional by enabling the insertion of dynamic elements and separating them from static elements in a web page. JSPs are well-known in the art, and therefore not described in further detail herein. The response to every JSP file requested by a browser, is generated by an instance of a dynamic servlet. If the dynamic servlet does not exist at the time the JSP file is requested, it will be created "on the fly" by compiling the JSP file into java code which is then compiled into a dynamic servlet.

The dynamic servlet 72, upon being called by the action servlet 70, creates a web page (e.g., an HTML only response) containing the URL of the speech file 30 and returns the web page in a response 86 back to the browser 60. The dynamic servlet 72 may include a URL to the speech file 30 by retrieving the bean object 74 from the user session object 73 by name (e.g., "speechfile") and reads an attribute associated with the bean object 74 (e.g., a "speech" attribute). The name used to locate the bean object 74 is authored both in the action object 78 (which placed the bean object 74 into the user session object 73) and the JSP file in the form of a non-HTML tag. The action object 78 assigns the "speech" attribute of the bean object 74 to the URL of the speech file 30 (created in response to the request 68). In creating the web page, the dynamic servlet 72 retrieves the "speech" attribute of the bean object 74 and places it in a sound tag in the web page. It should be understood that the JSP file contains sound tags with non-HTML syntax. The non-HTML syntax is recognized by the dynamic servlet 72 and replaced with a URL to the speech file 30. The web page (HTML only) containing the sound tag with a URL of the speech file 30 is returned to the browser 60 as the response 86. The browser 60 renders the HTML in the web page and then resolves any URLs specified in the HTML tags. Any files pointed to by the URL are then retrieved and rendered in the browser window.

The application server 35 also includes a session listener 76. The session listener 76 is an object for erasing the speech file 30 from the server computer 20 after the user has terminated a browser session during which the speech file is played. The application server 35 passes the user session object 73 to the session listener 76 when the user session object 73 is about to be terminated. The session listener 76 queries the user session object 73 for the existence of a named bean object 74 (e.g., "speechfile"), and if the bean object 74 exists, it is retrieved. The session listener also retrieves the "speech" attribute referring to the speech file 30 from the bean object 74 and deletes the speech file 30.

Figure 4:
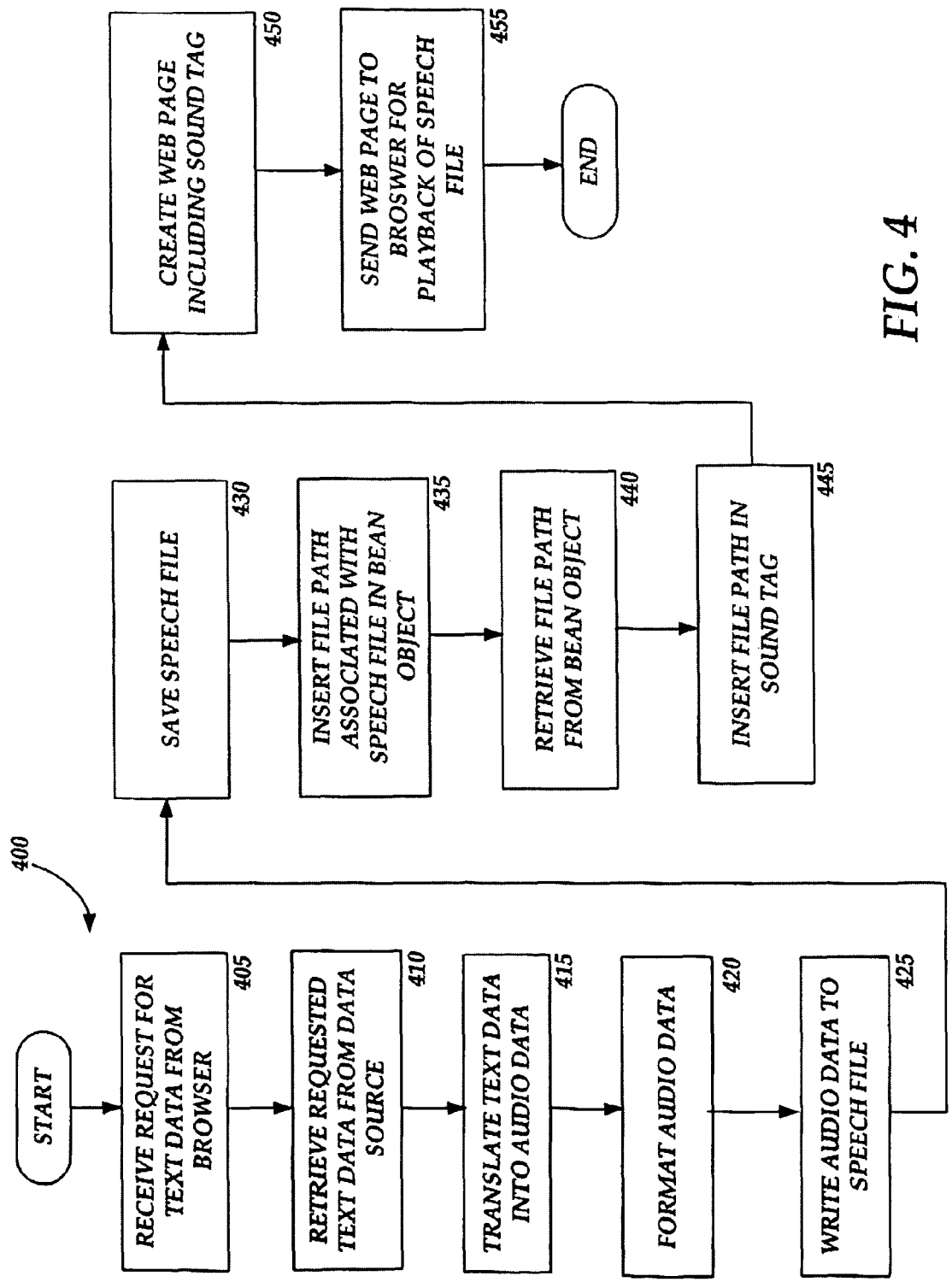
FIG. 4 is a flow diagram illustrating aspects of a process for associating dynamic sound content with a web page in a browser according to one embodiment of the invention.

FIG. 4 is a flow diagram illustrating a routine 400 for associating dynamic sound content with a web page in a browser according to one embodiment of the invention. When reading the discussion of the routines presented herein, it should be appreciated that the logical operations of various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated in FIG. 4, and making up the illustrative embodiments of the present invention described herein are referred to variously as operations, structural devices, acts, or modules. It will be recognized by one skilled in the art that these operations, structural devices, acts, and modules may be implemented in software, in firmware, in special purpose digital logic, and any combination thereof without deviating from the spirit and scope of the illustrative embodiments of the present invention as recited within the claims set forth herein.

The routine 400 begins at operation 405, wherein the application server 35 receives a request for text data 52 from the browser 60. In particular, the browser request is received by the action servlet 70. The request may include presenting the text data 52 as speech in a web page returned to the browser 60 by the application server 35. For instance, a web site for accessing insurance information may prompt a user to enter his/her social security number which is used as a basis for returning data particular to the user such as name, address, and policy information. From operation 405, the routine 400 continues to operation 410 where the action servlet 70 retrieves the requested text data 52 from a data source, such as the database 50. In particular, the action servlet 70 instructs the action object 78 to retrieve the text data 52 from the database 50.

From operation 410, the routine 400 continues to operation 415 where the action object 78 translates the retrieved text data 52 into audio data. In particular, the TTS 80 selects a voice (i.e., the voice object 82) and converts the text data 52 into raw byte arrays which are then passed to the file audio player 84. From operation 415, the routine 400 continues to operation 420 where the action object 78 formats the audio data into an audio file format (e.g., the WAV audio format). In particular, the TTS 80 passes the raw byte arrays to the file audio player 84 which formats the audio data. From operation 420, the routine 400 continues to operation 425 where the file audio player 84 writes the formatted audio data to the speech file 30.

From operation 425, the routine 400 continues to operation 430 where the action object 78 saves the speech file 30 to a file location in the server computer 20. From operation 430, the routine 400 continues to operation 435 where the action object 78 inserts the bean object 74 into the user session object 73. It will be appreciated that prior to inserting the bean object, the action object 78 assigns the file path (URL) of the speech file 30 to the "speech" attribute of the bean object 74. From operation 435, the routine 400 continues to operation 440 where the dynamic servlet 72 retrieves the bean object 74 from the user session object 73. Subsequently the "speech" attribute (i.e., the file path associated with the location of the speech file 30) of the bean object 74 is retrieved. As discussed above in the description of FIG. 3, the dynamic servlet 72 creates the web page sent as a response to the browser request 68 made in operation 405.

From operation 440, the routine 400 continues to operation 445 where the dynamic servlet 72 inserts the "speech" attribute retrieved from the bean object 74 into a sound tag which will be used in creating the web page sent as a response to the browser request made in operation 405. In one illustrative embodiment, the sound tag may be the BGSOUND tag corresponding to various HTML specifications for identifying a sound file to be played when a web page is opened in a browser. From operation 445, the routine 400 continues to operation 450 where the dynamic servlet 72 creates a web page including the sound tag. From operation 450, the routine 400 continues to operation 455 where the dynamic servlet 72 sends the created web page to the browser 60. The browser 60 then resolves the URL (i.e. reference to the speech file) in the sound tag of the web page. The browser 60 retrieves the speech file by requesting it from the web server and plays it back. When the web page is opened in the browser 60, the speech file 30 is then played. From operation 455, the routine 400 ends.

Based on the foregoing, it should be appreciated that the various embodiments of the invention include methods, systems, and computer-readable media for associating dynamic sound content with a web page in a browser. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for associating dynamic sound content with a web page, comprising:
receiving a request for text data from a browser, wherein the request for text data is received in an action servlet running on an application server;
retrieving the requested text data from a source associated with the web page;
converting the retrieved text data into a sound file;
creating a web page comprising a sound tag pointing to a file path associated with the sound file by inserting the file path associated with the sound file into an object, retrieving the file path from the object, and inserting the file path into the sound tag; and
sending the web page comprising the sound tag in a response to the browser, wherein the browser initiates playback of the sound file from the file path.

2. The method of claim 1, further comprising:
saving the sound file, wherein the file path associated with the saved sound file is inserted into the object.

3. The method of claim 1, wherein converting the retrieved text data to the sound file comprises:
translating the text data into a voice, the voice comprising audio data;
formatting the audio data based on a predetermined audio format; and
writing the formatted audio data to a file.

4. The method of claim 1, wherein converting the retrieved text data into the sound file comprises converting the received text data into the sound file in an action object in communication with the action servlet.

5. The method of claim 1, wherein the sound file comprises speech.

6. The method of claim 1, wherein the source is a database.

7. The method of claim 1, wherein the sound tag is communicated from a dynamic servlet to the action servlet and the dynamic servlet contains HTML content in addition to the dynamic content.

8. The method of claim 7, wherein the dynamic servlet is created by compiling a java server page into java code, wherein the java server page enables insertion of the dynamic content.

9. A computer system for associating dynamic sound content with a web page, comprising:
a memory for storing executable program code for creating web pages; and
a processor, in communication with the memory, the processor being responsive to computer-executable instructions contained in the program code and operative to:
receive a request for text data from a browser, wherein the request for text data is received in an action servlet running on an application server;
retrieve the requested text data from a source associated with the web page;
convert the retrieved text data into a sound file; and
create a web page comprising a sound tag pointing to a file path associated with the sound file, wherein the web page comprising the sound tag is created by inserting the file path associated with the sound file into an object, retrieving the file path from the object and inserting the file path into the sound tag; and
send the web page comprising the sound tag in a response to the browser, wherein the browser initiates playback of the sound file from the file path.

10. The computer system of claim 9, wherein the processor is further operative to save the sound file to the memory, wherein the file path associated with the sound file is inserted into the object.

11. The computer system of claim 9, wherein in converting the retrieved text data to the sound file the processor is further operative to translate the text data into audio data, format the audio data based on a predetermined audio format, and write the formatted audio data to a file.

12. The computer system of claim 9, wherein the retrieved text is converted into the sound file in an action object in communication with the action servlet.

13. The computer system of claim 9, wherein the sound file comprises speech.

14. The computer system of claim 9, wherein the source is a database.

15. A non-transitory computer-readable storage medium having computer-executable instructions which when executed on a computer perform a method for associating dynamic sound content with a web page, the method comprising:
receiving a request for text data from a browser, wherein the request for text data is received in an action servlet running on an application server;
retrieving the requested text data from a source associated with the web page;
converting the retrieved text data into a sound file;

creating a web page comprising a sound tag pointing to a file path associated with the sound file by inserting the file path associated with the sound file into an object, retrieving the file path from the object, and inserting the file path into the sound tag; and sending the web page comprising the sound tag in a response to the browser, wherein the browser initiates playback of the sound file form the file path.

16. The non-transitory computer-readable medium of claim 15, wherein the method further comprises:

saving the sound file, wherein the file path associated with the saved sound file is inserted into the object.

17. The non-transitory computer-readable medium of claim 15, wherein the retrieved text is converted into the sound file in an action object in communication with the action servlet.

* * * * *